J. C. FOLEY.
Fire-Escape Apparatus.
No. 213,327.            Patented Mar. 18, 1879.
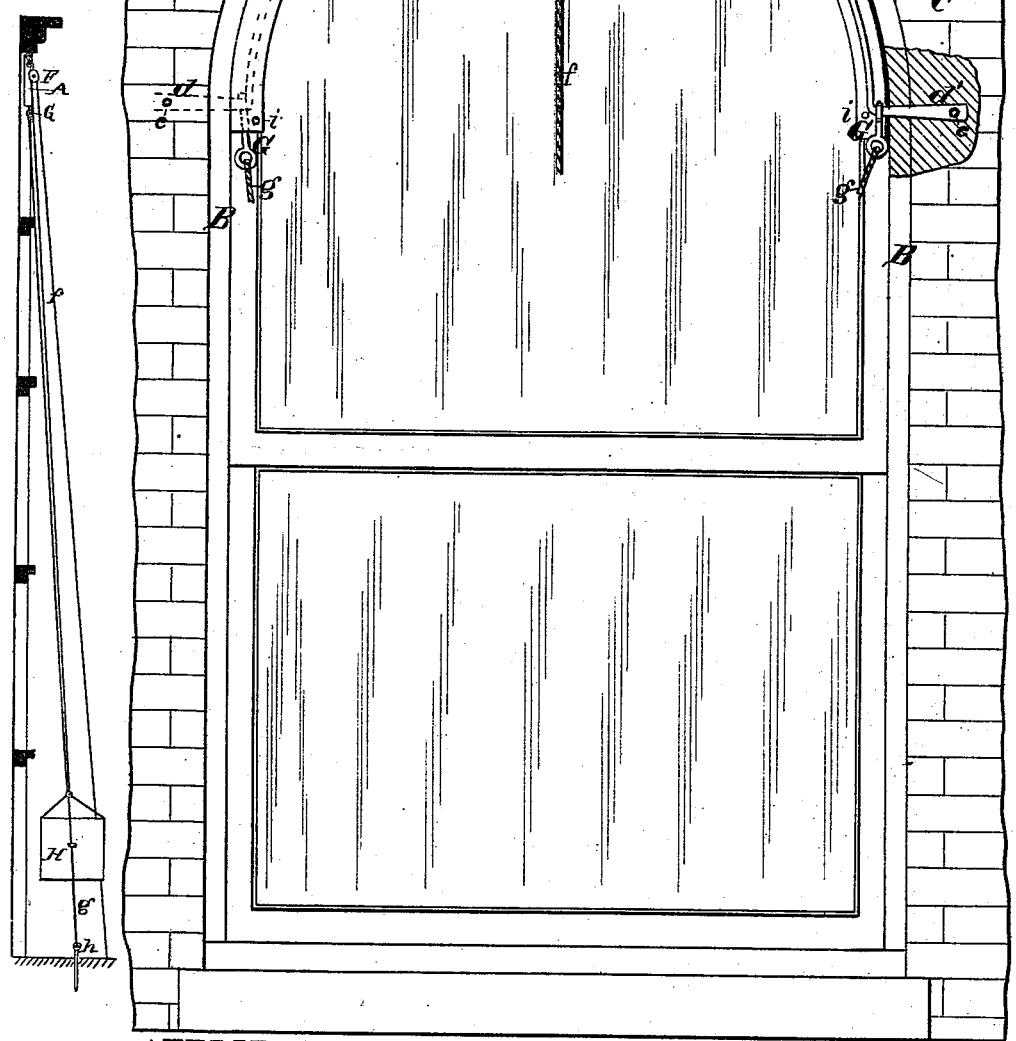
ATTEST.
Alex J. Thomson
W. J. Thomson
INVENTOR.
John C. Foley. per
Jos. E. Ware. Attorney.

UNITED STATES PATENT OFFICE.

JOHN C. FOLEY, OF ST. LOUIS, MISSOURI.

IMPROVEMENT IN FIRE-ESCAPE APPARATUS.

Specification forming part of Letters Patent No. 213,327, dated March 18, 1879; application filed October 26, 1878.

*To all whom it may concern:*

Be it known that I, JOHN C. FOLEY, of the city of St. Louis and State of Missouri, have invented certain new and useful Improvements in Fire-Escape Apparatus; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My object in this invention is to provide for high buildings an attachment to their upper window-cases or side walls, whereby, through the wire ropes and tackle thereto held and the co-operation of persons on the ground, effective means of escape, rescue, or access are obtainable in cases of the interruption of ordinary exit by fire.

The nature of my invention consists in the attachment, by bolts or strong screws, to the frames of windows or to their masonry side walls, of an arched incasement of sheet-iron containing an arch-bar, to which I attach, at its apex, a clevis, into which enters the hook or the strap-thimble of a pulley. I reeve through this pulley a flexible wire rope, one-half or five-eighths inch answering, which, when doubled its entire length, will reach the ground. On a long hook within the window I neatly coil this rope. To eyehooks suspended within the angles of the said arch-bar I also attach lighter wire ropes, to act as guys for steadying the objects held in suspension by the central rope. To the free ends of the guys I attach iron anchor-pins, which, when the ropes reach the ground, may be driven into any interstices in the sidewalk or pavement.

I do not confine myself to any particular character of car, chair, or basket. The article which may be provided or improvised must, to prevent its spinning around, be held to the guys by loops, eyes, or other free-running substitute therefor.

In the following drawings, in which similar letters of reference indicate corresponding parts, Figure 1 shows the attachment of my arrangement to a window-case by the insertion of screw-bolts through the iron casing thereof, or when built into the masonry of the side walls. Fig. 2 shows, in side elevation, the suspension-rope attached to the cage and eye-holes through which the guy-lines pass to be secured to the ground or elsewhere by the anchor-pins driven in the ground.

The arch-bar D within the galvanized-iron casing A has turned at right angles outward the elbow-plates $d'$. The guy-hooks G are suspended from the angles of the said arch-bar, and are placed thereon prior to the flattening of the ends. To the apex of the said arch-bar the clevis E hangs. For the attachment of the said casing to the window-frame, large four-inch wood-screws or square-headed screw-bolts through the holes $i\ i\ i$ are sufficient; but when the attachment can be by insertion into masonry the flattened parts $d'$ are built into the wall C, or held to pieces of joist built in therefor, to which bolts through the bolt-holes $c$ will secure them. The pulley F, over which passes the suspension-rope $f$, is hooked to the said clevis E.

The guy-lines $g$ are secured by their upper ends to the guy-hooks G, while to the free ends are attached iron-eyed anchor-pins, and which are intended to be driven into the sidewalk, if practicable; but otherwise any interstices in the pavement will answer. The cage H, while suspended, should have the said guy-lines $g$ in some safe manner connected therewith, either by guide eyes or loops, it being essential that the guys should be as tight as their anchorage in the ground $h$ will permit.

In the operation of my arrangement its effectiveness is dependent upon a careful attention to the fact that the suspension-rope and the guys are properly coiled and hung upon long hooks within the window; and whenever used it must be seen that the rope in its doubled state has reached the ground, which, when ascertained, the guy-lines are to be dropped with equal care to avoid fouling. When the suspension-rope has reached the ground, if the necessities of the situation will permit, a fireman should, by all means, be hoisted back by the rope, to take practical charge of operations aloft, according to methods which may have to be improvised at the moment.

The uses of the guy-lines are to steady the descent of or ascent of persons and to draw the car or persons away from projecting cornices, balconies, &c.

Simple as is my method, servants, porters, janitors, and others ought to be frequently drilled, to secure its effective application, and even hotel guests should gain a knowledge of its working.

I do not claim anything in the connection of cars, cages, baskets, chairs, or any other similar devices for attachment, they being very common as such, and not always available or practical; nor do I claim the ropes and anchor-pins.

What I do claim as my invention is—

In fire-escape arrangements for high buildings, the arch-bar D and incasement A, attached as shown, combined with the ropes $f\ g$, for suspension and guidance, to be operated with any suitable cars, chairs, or similar devices, substantially for the purposes set forth herein.

In testimony that I claim the foregoing as my own invention I affix my signature in presence of two witnesses.

JOHN C. FOLEY.

Witnesses:
JOSEPH E. WARE,
ALEX. J. THOMSON.